July 13, 1937. G. D. PEET 2,086,957

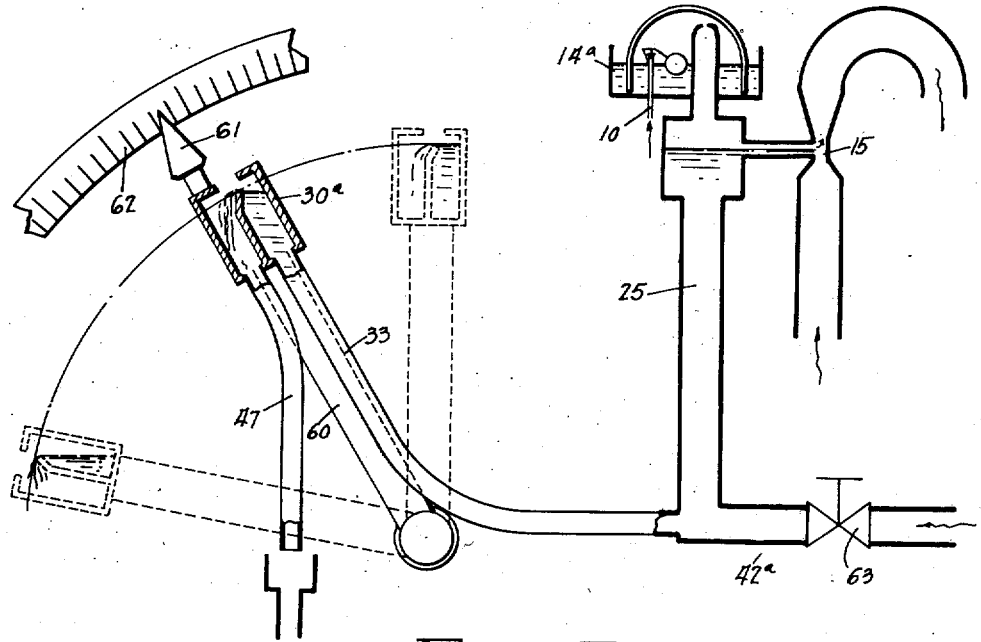
Fig. 2
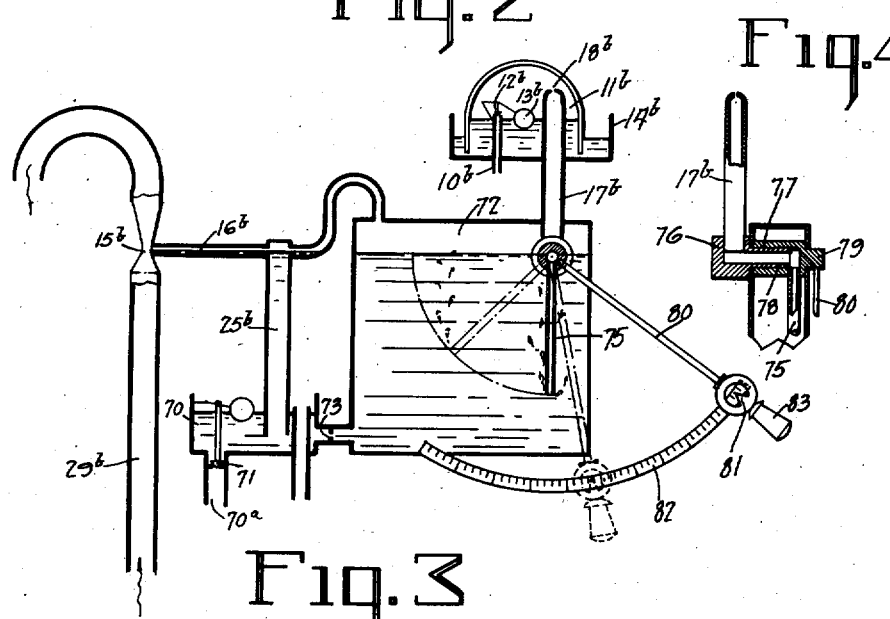
Fig. 3
Fig. 4

VACUUM CONTROL APPARATUS

Filed Oct. 31, 1934 3 Sheets—Sheet 3

INVENTOR
Gerald D. Peet
BY
Arthur L. Kent
his ATTORNEY

Patented July 13, 1937

2,086,957

UNITED STATES PATENT OFFICE 2,086,957

VACUUM CONTROL APPARATUS

Gerald D. Peet, Montclair, N. J., assignor to Wallace & Tiernan Company, Inc., Belleville, N. J., a corporation of New York Application October 31, 1934, Serial No. 750,751

31 Claims. (Cl. 210—28)

This invention relates to apparatus for controlling the production of a partial vacuum, or negative pressure, and more especially to apparatus for supplying gas at a controlled rate. The main object of the invention is to improve the accuracy of adjustment and indication of gas flow rate in gas supply apparatus in which the flow rate depends on the drop in pressure across a flow-controlling orifice and is indicated by and is adjusted according to such drop in pressure. The invention has been made especially with the idea of its application to apparatus for supplying chlorine gas at a controlled and measured rate to flowing water, such as the water of city and town water supplies or sewage or other watery liquids, but is equally adapted for supplying other treating gases and chlorine gas for other purposes.

In the treating of water with chlorine, the chlorine is usually fed into a stream of the water to be treated, and it is necessary that the rate of supply of the chlorine be accurately controlled and that it be metered in order that the amount being supplied may be known. One method of control which has been largely used in chlorine control apparatus is to cause the gas to pass through a flow-controlling orifice and to control and vary the rate at which the gas is supplied by controlling and varying the drop in pressure across the orifice, and to determine the rate of flow of the gas by using an orifice of known size and measuring the drop in pressure across the orifice by maintaining a constant pressure of the gas on one side and measuring the pressure difference by means of a manometer.

In the chlorine supply apparatus of the Wallace Patent No. 1,777,986, dated October 7, 1930, for example, a supply of chlorine gas is maintained at a constant substantially atmospheric pressure in a glass walled chamber and the flow-controlling orifice is at the top of a meter tube extending upward within this chamber, the gas outlet is through a tube extending upward within the meter tube, and the negative pressure on the outlet side of the orifice, that is, within the upper part of the meter tube, is shown by the height of a column of liquid which is raised within the tube. A scale is marked on or associated with the meter tube. As the pressure at the inlet side of the orifice is constant, the drop in pressure across the orifice will vary as the negative pressure at the outlet side of the orifice varies. This pressure is read on the meter scale, which is usually calibrated to read in pounds of chlorine per 24 hours. Inasmuch as the flow of gas through the orifice varies as the square root of the head across the orifice, adjustment of the flow rate at the low rates of feed, that is, with a very small pressure drop across the orifice, is difficult because of the relatively small change in head required to produce a relatively great change in the flow rate, and such meter scales, in addition to being of limited length, are compressed at the low flow end and relatively expanded at the high flow end, so that on flows close to the low limit of the meter it is difficult to obtain accurate readings; and this adds to the difficulty of adjusting the flow rate at the low rates of feed, since such adjusting depends on accurate reading of the meter. Also, in negative pressure control apparatus other than apparatus for supplying gas at a controlled rate, accurate adjustment and measurement of the negative pressure at low vacuums where great accuracy is necessary is very difficult.

According to the present invention these difficulties are overcome by providing negative pressure control apparatus in which the negative pressure is determined by a negative hydraulic head the amount of which depends on the elevation with respect to a predetermined level of a fluid-discharging control member mounted to move in an arcuate path which as the control member moves toward the position which causes the least negative pressure, that is, the lowest degree of vacuum, curves toward the horizontal, and as the control member moves toward the position which causes the greatest negative pressure, curves toward the vertical, so that when the negative pressure is high, that is, in the upper portion of the range of the apparatus, any movement of the fluid-discharging control member in its curved path results in a nearly equal vertical movement or change in elevation of the member, but that, when the negative pressure is in the lower portion of the range, in order to raise or lower the control member any desired distance it must be moved a much greater distance in its curved path. The extent of movement of the control member to produce a given change in the negative pressure, which is determined by the negative head, thus increases as the negative pressure decreases.

The control member in one form of apparatus according to the invention is an overflow member which determines the normal level from which water or other liquid is raised in a water column tube to provide a negative head against the suction of a water aspirator or other suction device, the controlling negative head and resulting negative pressure on the suction side of the suction device being decreased as the controlling overflow member is moved upward, and the path of movement of the overflow member curving toward the horizontal as the overflow member moves upward toward its position in which the negative head and resulting negative pressure are at the lowest point within the range of the control apparatus.

In another form of apparatus according to the invention the control member is a gas-discharge member mounted for discharging gas into a body of liquid within a closed chamber to provide a negative head which is measured by the distance the discharge outlet of the control member is below the surface level of the liquid. If the closed chamber is connected in series between a suction device and the chamber or space from which gas is to be sucked with the gas passing through the gas-discharging control member, then the path of movement of the control member will curve downwardly toward the horizontal, since the hydraulic head against which the gas is drawn by the suction device increases as the outlet of the control member is moved downward further beneath the surface level of the liquid, and it is this interposed hydraulic head which decreases the negative pressure in the suction line between the control member and the chamber or space from which gas is being sucked, so that the negative pressure decreases as the control member is moved downward to increase the negative head. If, however, the closed chamber within which the control member is immersed in water or other liquid is connected to a suction device in multiple with the main suction line and the purpose of the control member is to supply air as a make-up gas to the suction device under a controlling negative head for reducing the negative pressure on the suction side of the suction device, then the negative pressure produced by the suction device will decrease as the negative head decreases, and the control member will be mounted to move in a path which curves upwardly toward the horizontal, so that as the outlet of the control member approaches the surface level of the water and the negative head against which make-up air is sucked by the aspirator decreases, the movement of the control member for causing a given change in elevation of its outlet, and resulting corresponding change in the negative head, will increase. In both cases the movement of the control member for producing a given change in the effective negative pressure increases as said negative pressure decreases.

To obtain full advantage of the invention, suitable indicating means is provided comprising a scale and a pointer, one of which moves with the control member and thus has the extended movement of the control member in the low vacuum end of the range, the scale divisions being correspondingly spread at the low vacuum end if marked to show change in vacuum, or negative pressure.

The invention finds its greatest usefulness in gas supply apparatus in which the flow rate depends on the drop in pressure across a flow-controlling orifice. In a gas supply apparatus embodying the features of the invention in the preferred form, the gas is drawn from a chamber in which a supply of the gas is maintained at a constant substantially atmospheric pressure through a flow-controlling orifice by means of a suction device which has a capacity in excess of that required to draw the gas through the control orifice at the desired maximum rate, and a desired negative pressure on the suction side of the suction device, and therefore on the outlet side of the orifice, is maintained by supplying make-up water to the suction device under a negative head equal to the negative pressure to be maintained, and this negative head is determined and is varied for varying the negative pressure in order to vary the rate of flow of gas through the control orifice by means of an overflow member movable to different elevations. The connection to this overflow member forms one branch of a U-tube to which water is continuously supplied and the other branch of which is formed by a water column tube in which the make-up water is raised by the suction device from the normal level determined by the position of the overflow member; and the overflow member is mounted to move in an arcuate, or curved, path which curves toward the horizontal as the overflow member approaches its highest position and curves toward the vertical as the member approaches its lowest position. Most desirably, the overflow member is mounted on a pivoted carrier to move downward from a position in which it is substantially vertically over the pivotal axis of the carrier through an arc of a circle of about 90°.

The amount of movement of the overflow member required to produce a given change in its elevation and a given change in the pressure-controlling negative head, and, therefore, of the negative pressure maintained on the suction side of the suction device, increases as the negative head decreases; and when its arcuate path of movement is an arc of a circle the extent of the movement of the overflow member will vary approximately in proportion to variation in the square root of the head, and, since the flow rate of the gas varies as the square root of the pressure drop across the control orifice and this pressure drop varies directly as the negative pressure maintained by the suction device, which is the same as the negative head, the flow rate of the gas will vary substantially in proportion to the movement of the control member. To show the flow rate of the gas, or the negative pressure from which the flow rate may be obtained, and to serve as a guide in setting the control member, a scale and pointer are provided, either one of which may be mounted to move with the control member. The scale is most desirably calibrated and marked to show the gas flow rate, and has throughout its length substantially equal divisions for unit changes in flow rate. In an apparatus for supplying chlorine gas, the scale may be calibrated to show pounds of chlorine gas per 24 hours, or otherwise as desired. If calibrated to show the negative pressure, or degree of vacuum, the divisions for showing unit changes in vacuum increase in length toward the low vacuum end of the scale.

The scale and the movement of the control member are not only extended at the low negative pressure, or low flow, end of the scale as compared to the high negative pressure, or high flow, end, but the whole distance through which the control member moves is extended as compared to the number of inches of vacuum, or negative pressure, produced. On the ordinary vertical manometers, the scale is no longer than the actual measured range of negative pressure, whereas in an apparatus according to the invention the path of movement of the control member is substantially longer than the range of negative pressure variation, and the scale may be any desired multiple of this length within the practical limits of apparatus construction. Accuracy of scale readings and adjustment are thus greatly increased, especially at the low vacuum, or low flow, end of the range of the apparatus. Because of this greater accuracy of scale readings and adjustment at low vacuum, control apparatus for chlorine gas or other gas may be made according to the invention of remarkably low capacity, although the invention may be equally well embodied in apparatus of high capacity.

Not only is the path of movement of the control member longer than the range, measured in inches, of negative pressure variation, but the range of negative pressure variation may be substantially greater than has heretofore been found practical in apparatus of the type of that shown in said Wallace Patent No. 1,777,986. And because of the greater range of negative pressure variation and the greater accuracy of scale readings and adjustment at low vacuum, the range of control and measurement of the gas flow, that is, the ratio between the minimum and the maximum flow, is substantially greater.

Apparatus according to the invention is particularly well adapted to automatic control, since it is necessary only to provide means for moving the control member automatically in the proper ratio to obtain the result desired. In automatic chlorinating apparatus for controlling the gas supply in accordance with the amount of flowing water to be treated, when the control member moves as explained in the arc of a circle, means for moving the control member proportionally to variation in the flow of the water to be treated, serves to vary the supply of gas substantially in proportion to the flow of the water.

A full understanding of the invention can best be given by a detail description of an approved form of gas supply apparatus according to the invention and certain other illustrative apparatus embodying certain features of the invention, and such a description will now be given in connection with the accompanying drawings, in which:

Fig. 2 is a diagrammatic view illustrating the invention as embodied in an apparatus of slightly modified form;

Fig. 3 is a diagrammatic view illustrating an apparatus embodying certain features of the invention;

Fig. 4 is a detail sectional view taken on line 4—4 of Fig. 3, but with the moving parts in slightly different position;

Figure 1:
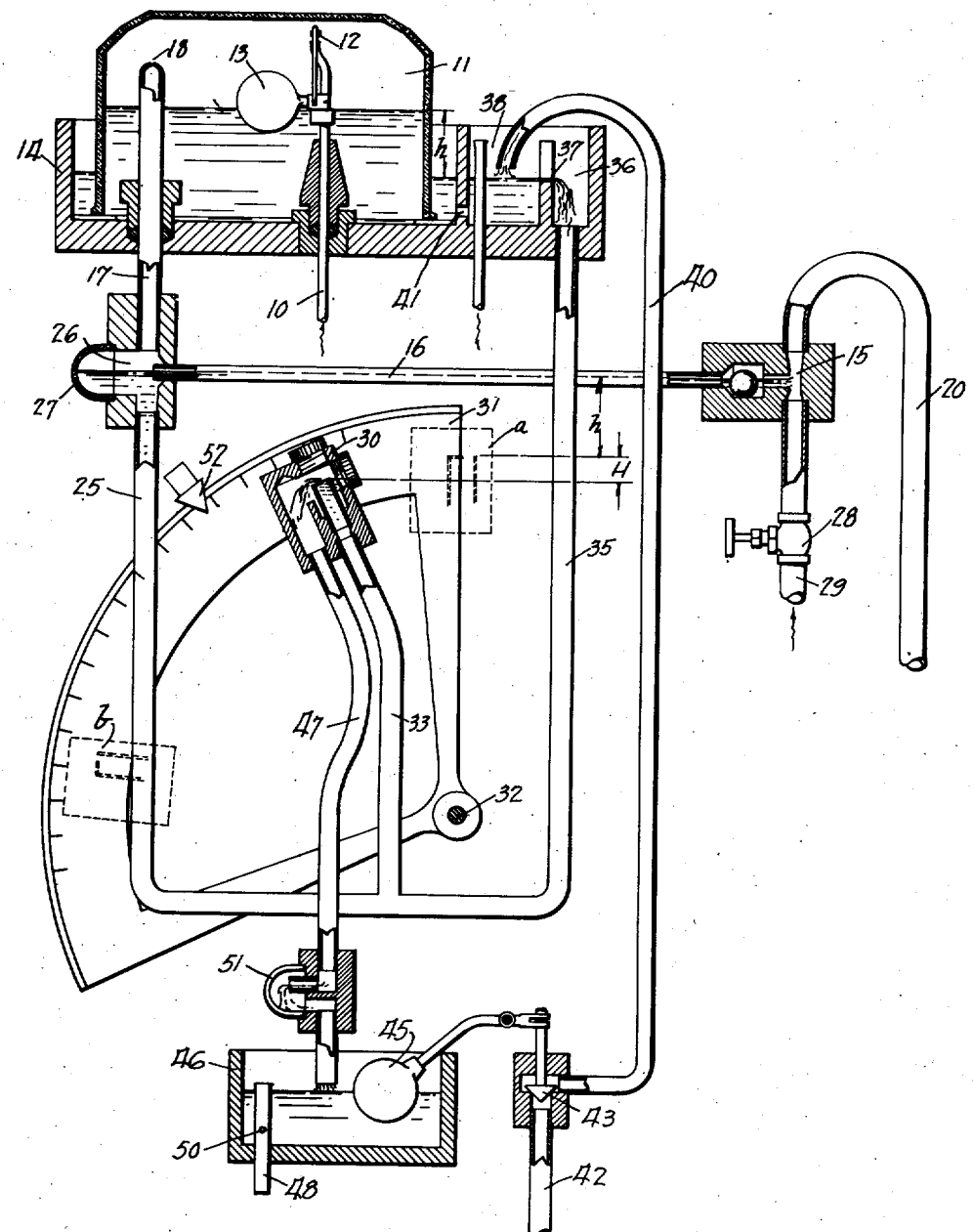
Fig. 1 is a sectional view, partly diagrammatic, of an apparatus intended especially for supplying chlorine gas at a controlled rate for the treatment of water.

Referring to the drawings, and first to Fig. 1, this figure shows an apparatus of the type of that shown and described in the Wallace Patent No. 1,777,986, dated October 7, 1930, modified according to the present invention. Chlorine gas from a tank of compressed liquefied chlorine or other source of supply under pressure flows through a supply tube 10 into a chamber 11 past a reducing valve 12 which is controlled by a ball float 13 to maintain a substantially atmospheric, and most desirably slightly negative, pressure within the chamber. The chamber casing, which may be a glass bell jar, extends upward from a tray 14 in which water is maintained at a constant level, and the chamber casing is supported so as to provide for the passage of water between the chamber and the space in the tray outside the chamber.

A water aspirator 15 is in communication with the chamber 11 through a suction passage 16, a gas passage 17 and a flow-controlling orifice 18 and draws chlorine gas from the chamber and mixes it with a minor flow of water flowing through the aspirator to be discharged through a discharge tube 20 into the flowing water which is being treated. The gas passage 17 is formed by a tube which extends upward within the chamber 11 to a point above the operating water level within the chamber, and the flow-controlling orifice 18 is formed in the upper end of this tube.

As gas is drawn from the chamber 11 by the action of the aspirator, the pressure within the chamber is reduced. As the pressure within the chamber is reduced below atmospheric pressure, the water rises in the chamber, and when the water reaches the level corresponding to the desired negative pressure to be maintained within the chamber the float 13 is lifted and opens the valve 12, permitting chlorine gas to enter the chamber. If the gas enters the chamber faster than it is withdrawn from the chamber by the aspirator, the water level within the chamber is depressed, permitting the float to fall and close the valve. Equilibrium is thus established and the gas is supplied to the chamber at the rate at which it is drawn from the chamber by the aspirator, and a supply of the gas will thus be maintained within the chamber at the desired substantially atmospheric pressure, the water remaining at a constant level within the chamber. The exact gas pressure and water level maintained within the chamber will be determined by the elevation of the float and valve operating mechanism, which are most desirably set to maintain, as stated, a slightly negative pressure within the chamber, in which case the normal operating level of the water within the chamber will be slightly above the water level in the tray outside the chamber by a distance which is the measure of the negative pressure within the chamber.

The rate at which the chlorine gas is drawn from the chamber by the aspirator will depend on the drop in pressure across the orifice 18 and the size of the orifice, and this pressure drop will depend on the negative pressure maintained on the suction side of the aspirator. This negative pressure is controlled and determined by the negative head of a column of water in a water column tube 25 from the upper end of which the suction passage 16 leads to the aspirator throat and the passage 17 leads to the orifice 18. At the junction of the suction passage with the water column tube and the gas passage there is a small suction chamber 26 one wall of which is formed by a sight glass 27.

The aspirator 15 has in operation a capacity somewhat greater than sufficient to draw gas at the maximum desired rate through the control orifice 18. The distance from the normal level of water in the water column tube 25 to the end of the suction tube 16 in the suction chamber 26 when the aspirator is not operating being equal to the negative pressure desired to be maintained in the suction chamber 26 and in the gas tube 17, the suction of the aspirator causes the water to be raised in the water column tube and excess capacity of the aspirator is satisfied by water drawn through the suction tube 16 in an amount sufficient to maintain the desired negative pressure in the chamber 26 and gas tube 17. The capacity of the aspirator may be controlled by a valve 28 in the pipe 29 which supplies water to the aspirator.

The apparatus as so far described is essentially as disclosed in said Wallace Patent No. 1,777,986, and as so far described a constant negative head in the water column tube will maintain a constant negative pressure on the suction side of the aspirator and the gas will be sucked into the minor stream of water flowing through the aspirator at a constant rate. In the particular form of apparatus shown in said patent, the negative head under which water is raised in the water column tube is constant, and the negative pressure maintained in the suction chamber, or on the suction side of the aspirator, is, therefore, also constant, and variation in the flow rate of the gas is obtained by variably reducing the suction head transmitted to the control orifice by means of an adjustable restriction in the gas passage between the suction chamber and the orifice.

In the Wallace Patent No. 1,777,987, a gas supply apparatus of the type of that of Patent 1,777,986 is shown, in which, however, variation in the rate of gas flow through the apparatus is obtained by varying the negative head of water in the water column tube from which make-up water for supplying the excess capacity of the aspirator is drawn, and such variation in the negative head is obtained by impressing a variable negative pressure on an overflow tube the lower end of which is connected to the lower end of the water column tube to form a U-tube to which water is supplied at a rate slightly in excess of that necessary to supply the required make-up water to the aspirator, the arrangement being such that as the controlling impressed vacuum, or negative pressure, becomes greater the negative head in the water column tube and the resulting negative pressure on the suction side of the aspirator become proportionately greater.

In the apparatus shown in Fig. 1, the negative head in the water column tube is varied for varying the negative pressure on the suction side of the aspirator and the pressure drop across the control orifice and the flow rate of the gas, by varying the normal water level in the water column tube by means of an overflow member which is movable to different elevations and the position of which determines the normal water level in the water column tube. The expression normal water level in the water column tube as used here and at other places in the specification means the water level in the tube when the aspirator is not in operation.

As shown in Fig. 1, the overflow member 30 is mounted on a substantially quadrant shaped carrier 31 pivoted at 32 and movable to move the member 30 between positions *a* and *b* indicated by dotted lines in an arcuate path which is the arc of a circle. The overflow member is connected by a flexible tube 33 to the lower end of the water column tube 25, which extends down below the lowest position of the overflow member, the water column tube thus forming one branch of a U-tube the other branch of which is formed by the tube 33 and the overflow member. Water is supplied to the U-tube through a supply tube 35 which extends upward to the tray 14, opening into a compartment 36 of the tray into which water flows over a weir 37 from a compartment 38 to which water is supplied through a pipe 40. The compartment 38 connects through an opening 41 with the main compartment of the tray 14 in which the bell glass is set. A constant water level will thus be maintained in the compartment 38 and in the main compartment of the tray, and water overflowing from compartment 38 into compartment 36 will constantly fall into the tube 35 for supplying the water column tube and for overflow from the member 30. The tubes 25, 33 and 35 should be of sufficient size practically to eliminate errors due to flow friction.

The amount of water so supplied to the U-tube should be sufficient to satisfy the demand of the aspirator for make-up water and to maintain at all times during operation a slight overflow from the overflow member. As shown, water is supplied to the pipe 40, from any suitable source of supply under suitable pressure, through a pipe 42, and the rate of supply is controlled by a valve 43 controlled by a float 45 in a constant level box 46 into which overflow from the overflow member 30 is discharged through a flexible discharge tube 47. The constant level box has an overflow tube 48 the upper end of which is slightly above the normal operating water level in the box, and outflow from the box is normally through a weep-hole 50 which as shown is formed in the overflow tube. If water is discharged from the overflow member 30 into the box 46 faster than water flows out through the weep-hole, the water level will rise and the float will close the valve 43 to reduce the rate of water supply through the pipe 42; and if the overflow from the member 30 is less than the outflow through the weep-hole, the water level will fall and the valve will be opened to increase the rate of water supply. Equilibrium will thus be established and water will be supplied to the U-tube at a rate such that the overflow from the member 30 will equal the outflow through the weep-hole, and the amount of water supplied through the pipe 42 will vary according to the amount of make-up water taken by the aspirator. Whatever water is required to satisfy the excess capacity of the aspirator is thus automatically supplied.

The discharge tube 47 connects to discharge into the constant level box 46 past a sight glass 51 which will be suitably located so that it may be viewed by the operator. Under normal operation of the apparatus for any given position of the overflow member 30, water will stand in the suction chamber 26 at the level of the suction tube 16 and a constant negative pressure will be maintained in the suction chamber, and there will be a constant flow of gas through the apparatus, and there will be a constant overflow from the member 30 through the tube 47 to constant level box 46. The operator can then know that the machine is functioning properly by noting that the water as seen through the injector suction sight glass 27 is at the proper level and that the weep stream past the sight glass 51 is normal.

The quadrant shaped carrier 31 is provided adjacent its periphery with a scale as shown, which as the carrier is turned moves past a pointer 52. The scale is desirably calibrated to indicate the rate of flow of the gas, usually in pounds per 24 hours. When calibrated to show the gas flow rate, the divisions of the scale for unit differences in flow rate will be substantially equal throughout the length of the scale, although not exactly so when the overflow member moves in the arc of a circle as shown. Any suitable means may be provided for turning the carrier. It has been found convenient to have the peripheral portion of the carrier, when of the quadrant shape shown, accessible through a sight opening through which the scale is viewed, so that it may serve as the means for turning the carrier.

When the overflow member 30 is in its uppermost position $a$, indicated by dotted lines, the negative head in the water column tube and the negative pressure in the suction chamber 26 are equal to the negative head and negative pressure in the chamber 11, and no gas flows through the orifice 18. But as the overflow member is moved downward in its arcuate path the normal water level for the water column tube is lowered and the negative head is increased and the negative pressure, or degree of vacuum, in the suction chamber is increased until the overflow member comes to its lowest position $b$, which is the position of greatest gas flow through the apparatus. I have found it desirable and entirely practical to make the vertical distance through which the overflow member is moved, and, therefore, the maximum negative head above the negative head in the chamber 11, 12 inches. This is considerably more than has been found desirable with apparatus such as shown in said Patents Nos. 1,777,986 and 1,777,987. It might be more or less than 12 inches. When the overflow member is mounted to move through an arc of 90° with a radius of 12 inches, giving a vertical movement, and therefore a variation in negative head, of 12 inches, the actual distance that the overflow member is moved in its arcuate path is about 21½ inches, and this increased length of its path of movement as compared to the resulting vertical distance through which it is moved is due to in increased ratio of actual movement to change in elevation as the member approaches its position of lowest negative head, with the result, as has been pointed out, that the movement of the member and the spreading of the scale for producing a given change in negative head increases as the negative head is decreased.

Whenever the degree of vacuum or negative pressure in the suction chamber 26 is greater than the negative pressure in the chamber 11 there will be a flow of gas from the chamber 11 through the orifice 18 to the suction chamber. If the gas were maintained at exactly atmospheric pressure in the chamber 11, then with any pressure less than atmosphere in the suction chamber there would be a pressure drop across the orifice 18 causing the gas to flow through the orifice, and as the negative pressure in the suction chamber varied, the pressure difference across the orifice would vary proportionately and the flow rate of the gas would vary as the square root of the pressure difference.

It is desirable, however, as stated, to maintain a slightly negative pressure in the chamber 11, such as a 2 inch vacuum, and the pressure difference across the orifice 18 then starts at a base which is not atmospheric pressure but 2 inches less than atmospheric pressure, and for accurate results the varying pressures maintained on the suction side of the aspirator should start from the same base. The pivoted carrier 31 is therefore mounted so that when the overflow member 30 is in its uppermost position its overflow edge, or weir, shall be at such a distance below the inlet opening to the suction tube 16 as to correct for this initial base, that is, 2 inches in the case supposed, and in any case a distance $h$ equal to the elevation of the water level within the chamber 11 above the water level in the tray 14 outside the chamber. The aspirator will then, when the overflow member is in its uppermost position, maintain a negative pressure in the suction chamber 26 just sufficient to maintain the desired negative pressure in the chamber 11 without any flow of gas through the orifice 18; and when the overflow member 30 is moved to any lower position within its range of movement the aspirator will have to lift the water in the water column tube the distance $h$ plus a distance H equal to the distance which the overflow member has been moved down below its uppermost position. Pressure difference across the orifice will then vary proportionately to variation in the negative pressure in the suction chamber from the base pressure $h$.

Fig. 2 shows diagrammatically the principal parts of an apparatus substantially similar to that of Fig. 1, but differing therefrom in some respects. As shown in this figure, the overflow member 30a is pivotally mounted to move in the arc of a circle as in Fig. 1, but instead of being carried by a quadrant shaped carrier the peripheral portion of which may serve also to bear the scale and as an operating means, the overflow member is carried by a pivoted arm 60 which also carries a pointer 61 which moves past an arcuate scale 62. This arrangement has the advantage that the pointer may, if desired, extend radially substantially beyond the overflow member so that the scale, set a corresponding radial distance from the pivotal axis of the carrier 60, will be correspondingly lengthened. Water is supplied to the U-tube formed by the water column tube 25 and flexible tube 33 leading to the overflow member 30a through a supply pipe 42a connected directly to a lower part of the U-tube and having a valve 63 by which the supply of water may be controlled so as to maintain the desired excess flow from the number 30a and through the waste tube 47. Any suitable means may be provided for supplying water to the constant level tray 14a.

Figs. 3 and 4 show a modified form of apparatus according to the invention and of the general type of the apparatus of Figs. 1 and 2, in which the control member which moves in an arcuate path is a gas discharge member mounted for discharging gas into a body of liquid within a closed chamber, and in which this gas discharge member is connected in series between the suction device and the constant-pressure chamber from which the gas is sucked.

As in Fig. 1, a water aspirator 15b draws the gas through a suction passage formed by a tube 16b from a suction passage formed by a tube 17b which has at its upper end a flow-controlling orifice 18b located within a chamber 11b to which the gas is supplied through a supply tube 10b past an inlet valve 12b controlled by a float 13b. The chamber 11b is in communication with a tray 14b to which water is supplied and maintained at constant level by any suitable means. The float controlled valve 12b operates as explained in connection with Fig. 1 to maintain a supply of gas at a constant substantially atmospheric pressure and a constant water level within the chamber 11b. As in the case of the apparatus of Fig. 1, the pressure maintained in the chamber 11b is most desirably a slightly negative pressure as indicated by the water level within the chamber in Fig. 3.

The negative pressure on the suction side of the aspirator is determined by the negative head of water in a water column tube 25b in which, when the apparatus is in operation, the water is raised by the aspirator so that water may flow through the tube 16b to supply the excess capacity of the aspirator. The water column tube extends upward from a constant level tray 70 to which water is supplied from a suitable source through a supply pipe 70a, the supply being controlled by a float controlled valve 71 so that a constant water level is maintained within the tray.

The suction tube 16b connects to the upper part of a suction chamber 72. This chamber is on a level with the water column tube 25b and its vertical dimension is at least equal to the vertical length of the water column tube, and it is connected to the constant level tank 70 below the water level in the tank through a flow restricting orifice 73. When the apparatus is in operation, therefore, water will be drawn into the suction chamber and maintained therein at the same level as in the water column tube.

The gas tube 17b does not connect directly to the gas space of the suction chamber 72 but has its connection through a pivotally mounted gas discharge tube 75, the pivotal axis of which is located at the level at which the water stands within the chamber when the apparatus is in operation. The discharge tube 75 may be pivotally mounted in any suitable manner so that its discharge end will move in an arcuate path which curves toward the horizontal as the end of the tube is moved downward and that the other end of the tube is connected to the gas tube 17b. As shown, the tube 17b is connected at its lower end to a fitting 76 secured to the wall of the suction chamber casing and having a tubular portion 78 which extends into the chamber, and the discharge tube 75 is a rigid tube the inner end of which is secured in an opening in a hollow sleeve 77 which is mounted to turn on the tubular extension 78 and has a part 79 which extends through the opposite wall of the chamber casing and has a bearing therein and has extending from it outside the casing an operating arm 80. A passage is thus provided for the flow of gas from the tube 17b to and through the discharge tube 75, and the discharge tube may be moved by means of the operating arm 80 to any position from the vertical downwardly extending position shown by full lines in Fig. 3 to a horizontal position in which its discharge end is at the normal water level within the chamber.

When the discharge tube is in its uppermost position with its outlet end at the water level within the chamber, there will be no loss of negative pressure, or vacuum, between the suction chamber and the outlet side of the control orifice 18b. The pressure drop across the orifice will then be equal to the difference between the negative pressure maintained in the chamber 11b and that maintained on the suction side of the aspirator or in the suction chamber 72. If, however, the discharge tube is turned to carry its discharge end a distance more or less below the water level in the suction chamber, then the suction transmitted to the orifice will be diminished by an amount equal to the negative head corresponding to the distance the outlet end of the discharge tube is below the water level in the chamber.

The pressure drop across the orifice and the flow rate of the gas will thus become less as the discharge tube 75 is moved downward toward the position shown by full lines in Fig. 3; and because of the arcuate path in which the end of the discharge tube moves, the movement of the discharge tube for producing a given change in the negative pressure transmitted to the orifice increases as this negative pressure decreases.

The vertical distance through which the discharge end of the discharge tube 75 moves is the measure of the maximum negative head which can be interposed between the suction device and the flow-controlling orifice, and if the negative pressure maintained on the suction side of the suction device is such that when sucking against this maximum head the negative pressure transmitted to the control orifice is only equal to the negative pressure being maintained within the chamber 11b, then by adjustment of the discharge tube 75 between its uppermost position in which its outlet is at the water level in the suction chamber and its lowermost position the drop in pressure across the orifice will be varied from zero to a maximum equal to the excess of the negative pressure on the suction side of the aspirator over the negative pressure in the chamber 11b.

The radial length of the discharge tube 75 and the angular distance of its range of movement downward from the water level thus determines the range of variation of pressure drop across the orifice and range of variation of gas flow rate; and if, as is desirable for securing full advantage of the invention, the aspirator suction is controlled to maintain a constant negative pressure within the suction chamber such that there will be no pressure drop across the orifice when the discharge tube 75 is in its lowermost position, then the radial length of the discharge tube and its maximum angular movement from its maximum flow position will determine the maximum pressure drop across the orifice and the maximum gas flow rate with a given orifice.

If exactly atmospheric pressure were maintained in the chamber 11b, then the negative head in the water column tube 25b should desirably be equal to the maximum negative head which is interposed in the suction line when the discharge tube 75 is in its lowermost position. It is, however, most desirable with this apparatus, as with the apparatus of Fig. 1, to maintain a slightly negative pressure in the chamber 11b, and in this case the total negative head in the water column tube is most desirably equal to the maximum pressure difference across the orifice plus the negative pressure on the inlet side of the orifice, that is, the pressure in the chamber 11b.

The operating arm 80 carries a pointer 81 which as the arm is moved to swing the tube 75 about its pivotal axis moves over an arcuate scale 82. The arm is for convenience provided with a handle 83. The scale, as in the apparatus before described, may be calibrated to show the pressure drop across the orifice, or, as is in most cases desirable, to show gas flow rate. When calibrated to show gas flow rate the scale divisions will be substantially equal throughout the length of the scale for equal differences in gas flow rate for the reasons which have been explained and which apply to this apparatus as well as to the apparatus of Figs. 1 and 2.

Figure 5:
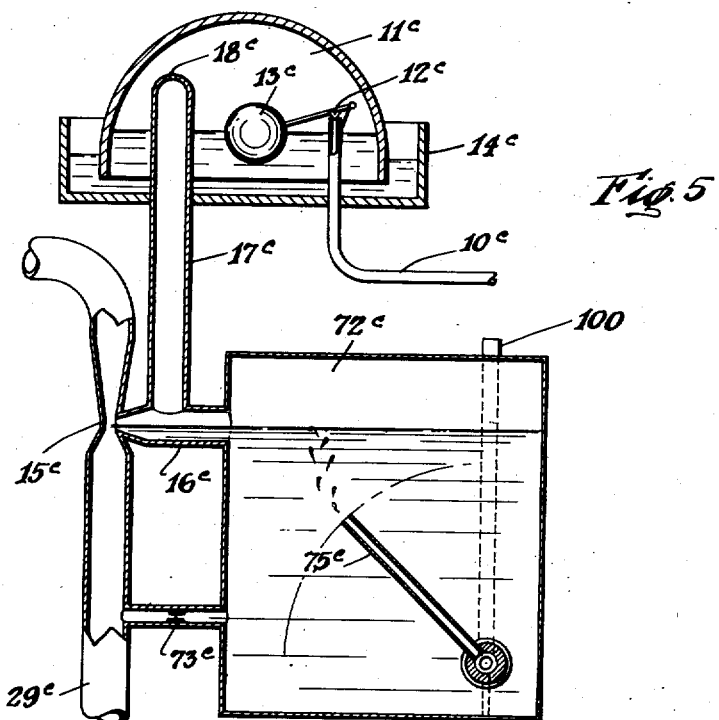
Fig. 5 is a diagrammatic view illustrating another form of apparatus embodying certain features of the invention.
Figure 6:
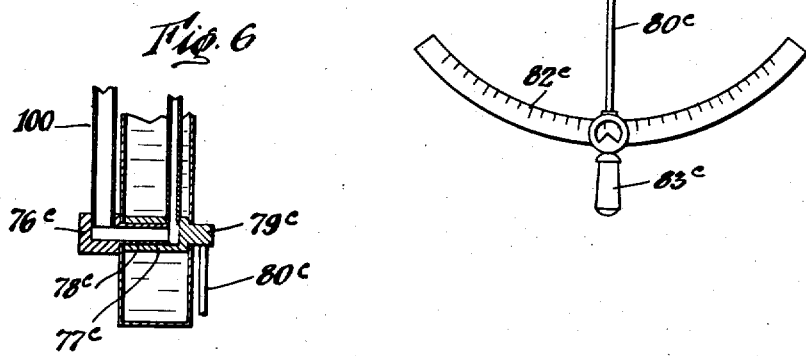
Fig. 6 is a sectional view of parts shown in Fig. 5 but with the part 75c in vertical position.

Figs. 5 and 6 show another modified form of vacuum control apparatus embodying certain features of the invention as applied to a gas supply apparatus of the general type of the apparatus of Figs. 1 and 2. In this apparatus, the control member which moves in an arcuate path is, as in the apparatus of Figs. 3 and 4, a gas discharge member mounted for discharging gas into a body of liquid within a closed chamber, but in this apparatus the gas discharge member, instead of being connected in series between the suction device and the chamber from which the gas is sucked, is connected to the suction device in multiple with the main suction passage, and the gas drawn through the gas discharge member serves as make-up fluid which is supplied to the suction device to determine the negative pressure maintained thereby.

As in the apparatus of Figs. 1 and 3, a water aspirator 15c draws the gas from the chamber 11c to which the gas is supplied through a supply tube 10c past an inlet valve 12c controlled by a float 13c, the chamber being in communication with a tray 14c in which water is maintained at constant level by suitable means. The float-controlled valve 12c operates as hereinbefore explained to maintain a supply of gas at a constant substantially atmospheric pressure and a constant water level within the chamber 11c; and, as in the case of the apparatus previously described, the pressure maintained in the chamber 11c is most desirably a slightly negative pressure as indicated by the relation between the water level within the chamber and that in the tray 14c outside the chamber.

Gas is withdrawn from the chamber 11c by the aspirator through a flow-controlling orifice 18c at the end of a tube 17c extending within the chamber and thence through the suction passage provided by the tube 17c. The tube 17c connects to a suction tube 16c which leads to the throat of the aspirator from an upper part of a chamber 72c in which water is maintained at a constant level, as by providing a very small flow of water into the chamber by means of a connection between a lower part of the chamber and the aspirator supply pipe 29c, the connecting passage having a small flow-restricting orifice 73c, and excess water being withdrawn from the chamber by the aspirator through the suction tube 16c.

The capacity of the aspirator is somewhat greater than sufficient to draw gas at the maximum desired rate through the control orifice 18c, and the excess capacity of the aspirator is satisfied by make-up air supplied under a negative head which determines the negative pressure, or degree of vacuum, maintained in the chamber 72c and suction tube 16c and transmitted through the suction passage 17c. By varying the negative head under which the make-up air is supplied, the negative pressure transmitted through the suction passage is varied to vary the drop in pressure across the control orifice and thereby the flow rate of the gas.

The make-up air is admitted to the chamber 72c under an adjustably variable negative head through an air discharge member formed by a tube 75c submerged in the water in the chamber and pivotally mounted so that its discharge end will move in a vertical plane in an arcuate path which curves toward the horizontal as it is moved upward. As shown, the air discharge tube 75c, like the tube 75 of Figs. 3 and 4, extends from an opening in a hollow sleeve 77c which is mounted to turn on a tubular portion 78c extending into the chamber from a fitting 76c secured to the wall of the chamber and from which an air inlet tube 100 extends upward to a point outside the chamber above the level of the water in the chamber. The sleeve 77c has a closed end part 79c which extends through the opposite wall of the chamber and has a bearing therein, and connected to this end part 79c is an operating arm 80c by which the air discharge tube may be moved to any position between a vertical upwardly extending position in which its discharge end is nearest the surface level of the water and a horizontal position in which the discharge end is in its position of greatest submergence, the movement of the discharge end between these extreme positions being in an arcuate path which curves toward the horizontal as the discharge end is moved upward. The operating arm is as shown provided with a handle 83c for manual control, and it has a pointer to indicate position on a scale 82c, which, as before, may be calibrated to show the pressure drop across the orifice, or, and most desirably, to show the gas flow rate.

Air will thus be admitted to the chamber 72c through the inlet tube 100 and discharge tube 75c to pass to the aspirator through the suction tube 16c under a negative head the measure of which is the depth of submergence of the end of tube 75c. Whatever the position the discharge tube is in, the degree of vacuum or negative pressure maintained in the chamber 72c and in the suction passage 17c will be equal to the negative head measured by the distance the discharge end of the tube is below the water level, and the pressure drop across the control orifice will be equal to the difference between the negative pressure maintained in the chamber 72c and that maintained in the gas supply chamber 11c. If the discharge tube is turned to increase or decrease the submergence of its discharge end, the negative pressure in the chamber 72c and the suction transmitted to the orifice will be correspondingly increased or decreased.

The pressure drop across the orifice and the flow rate of the gas will thus become less as the air discharge tube is moved upward and will become greater as the tube is moved downward, and because of the arcuate path in which the end of the tube moves the movement of the tube for producing a given change in the negative pressure transmitted to the orifice increases as this negative pressure decreases, that is, as the tube moves toward its position of least submergence, and when the scale 82c is calibrated to show gas flow rate the scale divisions will be substantially equal throughout the length of the scale for equal differences in gas flow rate.

The radial distance from the pivotal axis of the air discharge tube to its outlet end will thus determine the range of variation of pressure drop across the orifice and range of variation of gas flow rate, if the tube is movable down to but not beyond its horizontal position; and the maximum negative pressure maintained in the chamber 72c will be that corresponding to the distance from the discharge end of the tube to the surface level of the water in the chamber when the tube is in its lowest position, and the distance from the discharge end of the tube to the water level when the tube is vertical will be the measure of the minimum negative pressure in the chamber, provided, however, that the amount of air drawn through the tube is not more than such as will pass upward through the water in separate bubbles or globules.

It is desirable in a gas supply apparatus such as shown that the least negative pressure maintainable in the chamber 72c be not less than, and most desirably just equal to, the negative pressure in the supply chamber 11c, and for this purpose the pivotal axis of the air discharge tube is at such distance below the water level and the tube is of such length that when the tube is in its uppermost position the submergence of its discharge end will be such as to maintain the desired minimum pressure in the chamber 72c.

As before pointed out, apparatus according to the invention, whether of the kind illustrated by Figs. 1 and 2 or that of Figs. 3 and 4 or 5 and 6, is particularly well adapted to automatic control because of its being necessary only to provide means for moving the control member automatically in the proper ratio to obtain the desired result and because the required movement of the control member for producing a given difference in flow rate of the gas is substantially the same throughout the whole range of adjustment. Apparatus of the type shown in Figs. 3 and 4 and in Figs. 5 and 6 has the further advantage that the gas discharging control member may be made very light so as to require very little power to move it. This type of apparatus is, therefore, especially well adapted for remote control use, the control member being operated by means of selsyn motors, telemetering devices or otherwise where only limited power is available.

What is claimed is:

1. Apparatus for supplying gas, comprising means providing a flow-controlling orifice, means for supplying the gas to the intake side of the orifice, a suction device for drawing the gas through the orifice, means for determining the drop in pressure across the orifice by a negative hydraulic head, and a member movable in a curved path for varying the drop in pressure across the orifice by varying said negative head, the amount of movement of which member to produce a given change in the pressure drop across the orifice increases as the head decreases.

2. Apparatus for supplying gas, comprising means providing a flow-controlling orifice, means for supplying the gas to the intake side of the orifice, a suction device for drawing the gas through the orifice, means for determining the drop in pressure across the orifice by a negative hydraulic head, a member movable in a curved path for varying the drop in pressure across the orifice by varying said negative head, the amount of movement of which member to produce a given change in the pressure drop across the orifice increases as the head decreases, and indicating means comprising a scale and a pointer one of which moves proportionately to the movement of said movable member.

3. Apparatus for supplying gas, comprising means providing a flow-controlling orifice, means for supplying the gas to the intake side of the orifice, a suction device for drawing the gas through the orifice, and means for varying the drop in pressure across the orifice by varying said negative head including an adjusting member movable in a curved path which as the adjusting member moves toward the position which causes the least drop in pressure curves toward the horizontal and the extent of movement of which to produce a given change in the pressure drop across the orifice varies approximately as the square root of the pressure drop.

4. Apparatus for supplying gas, comprising means providing a flow-controlling orifice, means for supplying the gas to the intake side of the orifice, a suction device for drawing the gas through the orifice, means for varying the drop in pressure across the orifice by varying said negative head including an adjusting member movable in a curved path which as the adjusting member moves toward the position which causes the least drop in pressure curves toward the horizontal and the extent of movement of which to produce a given change in the pressure drop across the orifice varies approximately as the square root of the pressure drop, and indicating means comprising a pointer and a substantially equi-spaced flow-indicating scale one of which is mounted to move with said movable member.

5. Apparatus for supplying a treating gas, comprising means providing a flow-controlling orifice, means for supplying the gas to the intake side of the orifice at a constant substantially atmospheric pressure, a suction device for drawing the gas through the orifice, means for determining the negative pressure on the suction side of the suction device by a negative hydraulic head, and means for varying said negative head comprising a fluid-discharging control member mounted to move in an arcuate path which as the control member moves toward the position which causes the least negative pressure curves toward the horizontal.

6. Apparatus for supplying a treating gas, comprising means providing a flow-controlling orifice, means for supplying the gas to the intake side of the orifice at a constant substantially atmospheric pressure, a suction device for drawing the gas through the orifice, means for determining the negative pressure on the suction side of the suction device by a negative hydraulic head, means for varying said negative head comprising a fluid discharging control member mounted to move in an arcuate path which as the control member moves toward the position which causes the lowest negative pressure curves toward the horizontal, and indicating means comprising a pointer and a scale one of which is mounted to move with said control member.

7. Apparatus for supplying a treating gas, comprising means providing a flow-controlling orifice, means for supplying the gas to the intake side of the orifice at a constant substantially atmospheric pressure, a suction device for drawing the gas through the orifice, means for supplying make-up fluid to the suction device under a negative head which determines the negative pressure maintained on the suction side of the suction device, and means for varying the negative head under which the make-up fluid is supplied, said last mentioned means including an adjusting member movable in a curved path which as the adjusting member moves toward the position which causes the least negative head curves toward the horizontal, whereby the movement of said member to produce a given change in the negative head increases as the head decreases.

8. Apparatus for supplying a treating gas, comprising means providing a flow-controlling orifice, means for supplying the gas to the intake side of the orifice at a constant substantially atmospheric pressure, a suction device for drawing the gas through the orifice, means for supplying make-up fluid to the suction device under a negative head which determines the negative pressure maintained on the suction side of the suction device, means for varying the negative head under which the make-up fluid is supplied, said last mentioned means including an adjusting member movable in a curved path which as the adjusting member moves toward the position which causes the least negative head curves toward the horizontal, whereby the movement of said member to produce a given change in the negative head increases as the head decreases, and indicating means movable with said adjusting member.

9. Apparatus for supplying a treating gas, comprising means providing a flow-controlling orifice, means for supplying the gas to the intake side of the orifice at a constant substantially atmospheric pressure, a suction device for drawing the gas through the orifice, means for determining the negative pressure on the suction side of the suction device by the negative head of a column of liquid raised by the suction device, and means for varying said negative head including an adjusting member the movement of which to produce a given change in head increases as the head decreases.

10. Apparatus for supplying a treating gas, comprising means providing a flow-controlling orifice, means for supplying the gas to the intake side of the orifice at a constant substantially atmospheric pressure, a suction device for drawing the gas through the orifice, means for determining the negative pressure on the suction side of the suction device by the negative head of a column of liquid raised by the suction device, an indicator, means for varying said negative head and for moving the indicator as the head varies but at a rate which increases proportionately to the variation in head as the head decreases.

11. The combination with a suction device, of a suction passage leading to the suction device, means for determining the negative pressure in the suction passage by the negative head of a column of water raised by the suction device, means for supplying make-up water to maintain said column of water, and means for varying said negative head by varying the level under atmospheric pressure from which the column of water is raised by the suction device.

12. The combination with a suction device, of a suction passage leading to the suction device, means for determining the negative pressure in the suction passage by the negative head of a column of water raised by the suction device, means for supplying make-up water to maintain said column of water, and an overflow member the position of which determines said negative head and which is movable to different levels for varying the negative head.

13. The combination with a suction device, of a suction passage leading to the suction device, means for determining the negative pressure in the suction passage by the negative head of a column of water raised by the suction device, means for supplying make-up water to maintain said column of water, an overflow member the position of which determines said negative head and which is movable to different levels for varying the negative head, and an adjusting member for moving the overflow member the movement of which to produce a given change in level of the overflow member increases as the overflow member is moved upward.

14. The combination with a suction device, of a suction passage leading to the suction device, means for determining the negative pressure in the suction passage by the negative head of a column of water raised by the suction device, means for supplying make-up water to maintain said column of water, and an overflow member the position of which determines said negative head and which is movable to different levels for varying the negative head, said overflow member being mounted to move in an arcuate path the upper portion of which curves toward the horizontal and the lower portion of which curves toward the vertical.

15. Apparatus for supplying a treating gas, comprising means providing a flow-controlling orifice, means for supplying the gas to the intake side of the orifice at a constant substantially atmospheric pressure, a water aspirator connected to draw the gas through said orifice and to mix it with a minor flow of water through the aspirator, means for determining the negative pressure on the suction side of the aspirator by the negative head of a column of water raised by the aspirator, means for supplying make-up water to maintain said column of water, and an overflow member the position of which determines said negative head and which is movable to different levels for varying said negative head, said overflow member being mounted to move in an arcuate path the upper portion of which curves toward the horizontal and the lower portion of which curves toward the vertical.

16. Apparatus for supplying a treating gas, comprising means providing a flow-controlling orifice, means for supplying the gas to the intake side of the orifice at a constant substantially atmospheric pressure, a suction device connected to a passage leading from the orifice, means for determining the negative pressure on the suction side of the suction device by the negative head of a column of water raised by the suction device, means for supplying make-up water to maintain said column of water, an overflow member the position of which determines said negative head and which is movable to different levels for varying said negative head, said overflow member being mounted on a pivoted carrier to move in an arcuate path which is the arc of a circle between an upper position in which it is substantially vertically over the pivotal axis of the carrier and a lower position, and indicating means comprising a pointer and a substantially equi-spaced flow-indicating scale one of which is mounted to move with the overflow member.

17. Apparatus for supplying a treating gas, comprising means providing a flow-controlling orifice, means for supplying the gas to the intake side of the orifice at a constant substantially atmospheric pressure, a suction device for drawing the gas through the orifice, and means for determining the negative pressure on the suction side of the suction device comprising a water column tube from which a suction passage leads to the suction device, an overflow tube, the bottom of said tubes being connected to form a U-tube, means for supplying make-up water to the U-tube, and an overflow member at the upper end of the overflow tube, said overflow member being movable to points of different elevation for varying the normal water level in the water column tube.

18. Apparatus for supplying a treating gas, comprising means providing a flow-controlling orifice, means for supplying the gas to the intake side of the orifice at a constant substantially atmospheric pressure, a suction device for drawing the gas through the orifice, and means for determining the negative pressure on the suction side of the suction device comprising a water column tube from which a suction passage leads to the suction device, an overflow tube, the bottom of said tubes being connected to form a U-tube, means for supplying make-up water to the U-tube, an overflow member connected to the upper end of the overflow tube, a quadrant-shaped pivoted carrier on which the overflow member is mounted and by movement of which the overflow member is moved in the arc of a circle between an upper position substantially vertically over the pivotal axis of the carrier and a lower position, a scale on the peripheral portion of the carrier, and a pointer to cooperate with the scale.

19. Apparatus for supplying a treating gas, comprising means providing a flow-controlling orifice, means for supplying the gas to the intake side of the orifice at a constant substantially atmospheric pressure, a suction device for drawing the gas through the orifice, means for maintaining a constant negative pressure on the suction side of the suction device, and means for variably reducing the suction head transmitted to the orifice comprising a closed liquid-containing chamber from an upper part of which above the liquid a suction passage leads to the suction device and a gas discharge control member to which a suction passage leads from the orifice, said control member being adjustably mounted for positioning its discharge outlet at different levels below the surface of the liquid in said chamber.

20. Apparatus for supplying a treating gas, comprising means providing a flow-controlling orifice, means for supplying the gas to the intake side of the orifice at a constant substantially atmospheric pressure, a suction device for drawing the gas through the orifice, means for maintaining a constant negative pressure on the suction side of the suction device, and means for variably reducing the suction head transmitted to the orifice, said last mentioned means comprising a closed chamber from an upper part of which a suction passage leads to the suction device, means for supplying liquid to be maintained at a constant level in said chamber, a control member formed by a gas discharge tube pivotally mounted within the chamber with its pivotal axis at about the surface level of the liquid in the chamber, and means for swinging said tube about its pivotal axis with its outlet end beneath the surface of the liquid, said tube being connected to a gas passage leading from the orifice for the flow of gas through the tube and out of its free end.

21. Apparatus for supplying a treating gas, comprising means providing a flow-controlling orifice, means for supplying the gas to the intake side of the orifice at a constant substantially atmospheric pressure, a closed chamber, a gas discharge control member mounted within said chamber and movable in an arcuate path which extends downward from the surface of the liquid in the chamber and curves toward the horizontal, a gas passage leading from the orifice and connecting to said control member, a suction device connected to draw gas from the upper part of said chamber, a constant level box, a water column tube extending upward from the constant level box to the suction passage between the suction device and said chamber, a water connection between said constant level box and said chamber, whereby water will be raised in said chamber by the suction device to the same level as in the water column tube, and means for varying the elevation of the control member beneath the surface of the water in the chamber for varying the suction head transmitted to the orifice.

22. Apparatus for supplying a treating gas, comprising means providing a flow-controlling orifice, means for supplying the gas to the intake side of the orifice at a constant substantially atmospheric pressure, a suction device for drawing the gas through the orifice, means for maintaining a constant negative pressure on the suction side of the suction device, and means for variably reducing the suction head transmitted to the orifice, said last mentioned means comprising a closed chamber from an upper part of which a suction passage leads to the suction device, means for supplying liquid to be maintained at a constant level in said chamber, and a gas discharge control member to which a gas passage leads from the orifice pivotally mounted within said chamber with its pivotal axis at about the surface level of the liquid in the chamber, an operating arm for moving the control member about its axis, an arcuate substantially equi-spaced flow-indicating scale, and a pointer moving with the operating arm to cooperate with the scale.

23. Apparatus for supplying gas, comprising means for supplying the gas at a constant substantially atmospheric pressure, a suction device for drawing the gas from said supply means, a passage leading from the supply means to the suction device including means for causing a pressure reduction in the gas flowing therethrough, means for determining the negative pressure at the suction device end of said passage by the negative head of a column of water raised by the suction device, means for supplying make-up water to maintain said column of water, and an overflow member the position of which determines said negative head and which is movable to different levels for varying the negative head.

24. Apparatus for supplying gas, comprising flow-controlling means, means for supplying the gas to the flow-controlling means at a constant substantially atmospheric pressure, a suction device for drawing the gas through the flow-controlling means, means for determining the drop in pressure across the flow-controlling means by a negative hydraulic head, and a member movable for varying said negative head the amount of movement of which to produce a given change in the pressure drop across the flow-controlling means increases as the pressure drop decreases.

25. Apparatus for supplying a treating gas, comprising flow-controlling means, means for supplying the gas to the flow-controlling means at a constant substantially atmospheric pressure, a suction device for drawing gas through the flow-controlling means, means for supplying make-up fluid to the suction device under a negative head which determines the negative pressure maintained by the suction device, and means for varying the negative head under which the make-up fluid is supplied, said last mentioned means including an adjusting member movable in a curved path which as the adjusting member moves toward the position which causes the least negative head curves toward the horizontal, whereby the movement of said member to produce a given change in the negative head increases as the head decreases.

26. The combination with a suction device, of a suction passage through which gas is sucked by the suction device, means for determining the negative pressure in said suction passage by a negative hydraulic head, and means for varying said negative head comprising a fluid discharge control member mounted to move in an arcuate path which as the control member moves toward the position which causes the least negative pressure curves toward the horizontal.

27. The combination with a suction device, of a suction passage through which gas is sucked by the suction device, means for supplying make-up fluid to the suction device under a negative head which determines the negative pressure maintained by the suction device, and means for varying the negative head under which the make-up fluid is supplied, said last mentioned means including an adjusting member movable in a curved path which as the adjusting member moves toward the position which causes the least negative head curves toward the horizontal, whereby the movement of said member to produce a given change in the negative head increases as the head decreases.

28. The combination with a suction device, of a suction passage through which gas is sucked by the suction device, means for supplying make-up air to the suction device under a negative head which determines the negative pressure maintained by the suction device, and means for varying the negative head under which the make-up air is supplied, said last mentioned means including an adjusting member the movement of which to produce a given change in the negative head increases as the head decreases.

29. The combination with a suction device, of a suction passage through which gas is sucked by the suction device, and means for variably determining the negative pressure transmitted through said suction passage comprising a closed liquid-containing chamber an upper part of which above the liquid is connected between said suction passage and the suction device and a gas discharge member adjustably mounted for positioning its outlet at different levels below the surface of the liquid in the chamber.

30. The combination with a suction device, of a suction passage through which gas is sucked by the suction device, means for maintaining a constant negative pressure on the suction side of the suction device, and means for variably reducing the negative pressure in said suction passage comprising a closed liquid-containing chamber from the upper part of which above the liquid there is a flow connection to the suction device and a gas discharge control member to which said suction passage is connected, said control member being mounted within said chamber and being adjustable to position its discharge outlet at different points in an arcuate path beneath the surface of the liquid in said chamber which curves downwardly toward the horizontal.

31. The combination with a suction device, of a suction passage through which gas is sucked by the suction device, and means for variably determining the negative pressure in said suction passage comprising a closed liquid-containing chamber an upper part of which above the liquid is connected to the suction device, and an air discharge control member having an air inlet thereto, said control member being mounted within said chamber and being adjustable to position its discharge outlet at different points in an arcuate path beneath the surface of the liquid which curves upwardly toward the horizontal.

GERALD D. PEET.

CERTIFICATE OF CORRECTION.

Patent No. 2,086,957. July 13, 1937.

GERALD D. PEET.

It is hereby certified that error appears in the printed specification of the above numbered patent requiring correction as follows: Page 8, first column, lines 46 and 58, claims 1 and 2 respectively, for the word "head" read pressure drop; and second column, line 44, claim 6, for "lowest" read least; page 5, first column, line 40, for "in" read an; page 7, first colline 20, for "the" before "chamber" read a; and that the said Letters Patent should be read with these corrections therein that the same may conform to the record of the case in the Patent Office.

Signed and sealed this 19th day of October, A. D. 1937.

Henry Van Arsdale.
Acting Commissioner of Patents.

(Seal)

suction passage through which gas is sucked by the suction device, means for determining the negative pressure in said suction passage by a negative hydraulic head, and means for varying said negative head comprising a fluid discharge control member mounted to move in an arcuate path which as the control member moves toward the position which causes the least negative pressure curves toward the horizontal.

27. The combination with a suction device, of a suction passage through which gas is sucked by the suction device, means for supplying make-up fluid to the suction device under a negative head which determines the negative pressure maintained by the suction device, and means for varying the negative head under which the make-up fluid is supplied, said last mentioned means including an adjusting member movable in a curved path which as the adjusting member moves toward the position which causes the least negative head curves toward the horizontal, whereby the movement of said member to produce a given change in the negative head increases as the head decreases.

28. The combination with a suction device, of a suction passage through which gas is sucked by the suction device, means for supplying make-up air to the suction device under a negative head which determines the negative pressure maintained by the suction device, and means for varying the negative head under which the make-up air is supplied, said last mentioned means including an adjusting member the movement of which to produce a given change in the negative head increases as the head decreases.

29. The combination with a suction device, of a suction passage through which gas is sucked by the suction device, and means for variably determining the negative pressure transmitted through said suction passage comprising a closed liquid-containing chamber an upper part of which above the liquid is connected between said suction passage and the suction device and a gas discharge member adjustably mounted for positioning its outlet at different levels below the surface of the liquid in the chamber.

30. The combination with a suction device, of a suction passage through which gas is sucked by the suction device, means for maintaining a constant negative pressure on the suction side of the suction device, and means for variably reducing the negative pressure in said suction passage comprising a closed liquid-containing chamber from the upper part of which above the liquid there is a flow connection to the suction device and a gas discharge control member to which said suction passage is connected, said control member being mounted within said chamber and being adjustable to position its discharge outlet at different points in an arcuate path beneath the surface of the liquid in said chamber which curves downwardly toward the horizontal.

31. The combination with a suction device, of a suction passage through which gas is sucked by the suction device, and means for variably determining the negative pressure in said suction passage comprising a closed liquid-containing chamber an upper part of which above the liquid is connected to the suction device, and an air discharge control member having an air inlet thereto, said control member being mounted within said chamber and being adjustable to position its discharge outlet at different points in an arcuate path beneath the surface of the liquid which curves upwardly toward the horizontal.

GERALD D. PEET.

CERTIFICATE OF CORRECTION.

Patent No. 2,086,957.     July 13, 1937.

GERALD D. PEET.

It is hereby certified that error appears in the printed specification of the above numbered patent requiring correction as follows: Page 8, first column, lines 46 and 58, claims 1 and 2 respectively, for the word "head" read pressure drop; and second column, line 44, claim 6, for "lowest" read least; page 5, first column, line 40, for "in" read an; page 7, first col-line 20, for "the" before "chamber" read a; and that the said Letters Patent should be read with these corrections therein that the same may conform to the record of the case in the Patent Office.

Signed and sealed this 19th day of October, A. D. 1937.

Henry Van Arsdale.
Acting Commissioner of Patents.

(Seal)

CERTIFICATE OF CORRECTION.

Patent No. 2,086,957. July 13, 1937.

GERALD D. PEET.

It is hereby certified that error appears in the printed specification of the above numbered patent requiring correction as follows: Page 8, first column, lines 46 and 58, claims 1 and 2 respectively, for the word "head" read pressure drop; and second column, line 44, claim 6, for "lowest" read least; page 5, first column, line 40, for "in" read an; page 7, first col- line 20, for "the" before "chamber" read a; and that the said Letters Patent should be read with these corrections therein that the same may conform to the record of the case in the Patent Office.

Signed and sealed this 19th day of October, A. D. 1937.

(Seal)

Henry Van Arsdale.
Acting Commissioner of Patents.